United States Patent
Moriyoshi

(10) Patent No.: US 8,731,065 B2
(45) Date of Patent: May 20, 2014

(54) DYNAMIC IMAGE STREAM PROCESSING METHOD AND DEVICE, AND DYNAMIC IMAGE REPRODUCTION DEVICE AND DYNAMIC IMAGE DISTRIBUTION DEVICE USING THE SAME

(75) Inventor: Tatsuji Moriyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 889 days.

(21) Appl. No.: 12/863,940

(22) PCT Filed: Jan. 22, 2009

(86) PCT No.: PCT/JP2009/050958
§ 371 (c)(1),
(2), (4) Date: Jul. 21, 2010

(87) PCT Pub. No.: WO2009/093647
PCT Pub. Date: Jul. 30, 2009

(65) Prior Publication Data
US 2010/0290537 A1  Nov. 18, 2010

(30) Foreign Application Priority Data
Jan. 24, 2008 (JP) ................... 2008-013703

(51) Int. Cl.
  H04N 7/12   (2006.01)
  H04N 11/02  (2006.01)
  H04N 11/04  (2006.01)
(52) U.S. Cl.
  USPC ............................. 375/240.25; 375/E07.026
(58) Field of Classification Search
  None
  See application file for complete search history.

(56) References Cited

U.S. PATENT DOCUMENTS

| | | |
|---|---|---|
| 2002/0009287 A1 | 1/2002 | Ueda |
| 2004/0033053 A1* | 2/2004 | Chen et al. .................. 386/83 |
| 2005/0135783 A1 | 6/2005 | Crinon |
| 2006/0093318 A1 | 5/2006 | Cohen et al. |
| 2008/0193107 A1* | 8/2008 | Kim et al. .................. 386/124 |
| 2009/0010334 A1 | 1/2009 | Ueda et al. |
| 2009/0129689 A1* | 5/2009 | Boyce .......................... 382/236 |

FOREIGN PATENT DOCUMENTS

| | | |
|---|---|---|
| EP | 1161097 A1 | 12/2001 |
| EP | 1187489 A1 | 3/2002 |
| JP | 63-310293 A | 12/1988 |
| JP | 5-344494 A | 12/1993 |

(Continued)

OTHER PUBLICATIONS

Taiwanese Office Action for TW098102816 mailed on Sep. 10, 2012.

(Continued)

Primary Examiner — Dave Czekaj
Assistant Examiner — Nam Pham
(74) Attorney, Agent, or Firm — Sughrue Mion, PLLC

(57) ABSTRACT

There are included: an extraction unit that extracts a first bit stream of a picture that is decodable by itself and a second bit stream of a picture whose image data part is decodable by itself but a part other than the image data part is not decodable by itself from a coded bit stream of a moving image; and a conversion unit that converts the second bit stream extracted by the extraction unit into a third bit stream of a picture that is decodable by itself, the first bit stream of the picture extracted by the extraction unit and the third bit stream being arranged and output in order of extraction or in reverse order to that of extraction.

9 Claims, 20 Drawing Sheets

(56) References Cited

FOREIGN PATENT DOCUMENTS

| | | |
|---|---|---|
| JP | 9-98430 A | 4/1997 |
| JP | 2003319340 A | 11/2003 |
| JP | 2004328511 A | 11/2004 |
| JP | 2004328634 A | 11/2004 |
| JP | 2006101323 A | 4/2006 |
| JP | 2006157855 A | 6/2006 |
| JP | 2006211617 A | 8/2006 |
| JP | 2007507128 A | 3/2007 |
| JP | 2007158788 A | 6/2007 |
| TW | 200701794 A | 1/2007 |
| TW | 200721844 A | 6/2007 |
| WO | 2005106875 A1 | 11/2005 |
| WO | 2005120060 A1 | 12/2005 |

OTHER PUBLICATIONS

European Search report for EP09704263.4 dated Nov. 14, 2012.
International Search Report for PCT/JP2009/050958 mailed Apr. 21, 2009.
ITU-T Recommendation H.264, Series H: Audiovisual and Multimedia Systems, Infrastructure of audiovisual services—Coding of moving video, Advanced video coding for generic audiovisual services, Mar. 2005, pp. 7, 38-55, 75-80, 98-102.
Jin-Hwan Jeong et al., "Trick Play Method for HD H.264 Set-Top Box", Int. Conf. on Consumer Electronics 2008 Digest of Technical Papers, Jan. 9, 2008, p. 4-12, pp. 1-2.

* cited by examiner

FIG. 18

| No. | BIT STREAM | FAST PLAY BIT STREAM |
|---|---|---|
| 1 | File01.stream | File01_FFW.stream |
| 2 | File02.stream | File02_FFW.stream |
| 3 | File03.stream | File03_FFW.stream |
| ⋮ | ⋮ | ⋮ |

FIG. 19

| No. | BIT STREAM | FAST PLAY BIT STREAM | | FAST REVERSE PLAY BIT STREAM | |
|---|---|---|---|---|---|
| | | File01_FFW.stream | | File01_FRW.stream | |
| | | PICTURE No. | TIME STAMP(sec) | | TIME STAMP(sec) |
| 1 | File01.stream | 1 | 0.0 | | 119.0 |
| | | 2 | 1.0 | | 118.0 |
| | | 3 | 2.0 | | 117.0 |
| | | 4 | 3.0 | | 116.0 |
| | | 5 | 4.0 | | 115.0 |
| | | 6 | 5.0 | | 114.0 |
| | | ... | ... | | ... |
| | | File02_FFW.stream | | | |
| | | ... | ... | | ... |
| 2 | File02.stream | | | | |
| ... | ... | | | | |

DYNAMIC IMAGE STREAM PROCESSING METHOD AND DEVICE, AND DYNAMIC IMAGE REPRODUCTION DEVICE AND DYNAMIC IMAGE DISTRIBUTION DEVICE USING THE SAME

TECHNICAL FIELD

The present invention relates to a method and apparatus (device) for processing a moving image stream (dynamic image stream), a moving image reproduction apparatus (dynamic image reproduction device) using the same, and a moving image distribution apparatus (dynamic image distribution device). In particular, the present invention is suitably used for special reproduction such as fast play and fast reverse play.

BACKGROUND ART

H.261 and H.263 standardized by ITU (International Telecommunication Union) are technologies for encoding a moving image signal at low bit rate, high compression rate, and high quality to generate coded data, and decoding a coded moving image. ISO (International Organization for Standardization) MPEG-1, MPEG-2, MPEG-4, etc. are also widely used as international standards.

In addition, H.264 has recently been standardized through collaboration between ITU and ISO (NPL 1). As compared to the conventional moving image coding technologies, the H.264 is known to be able to provide further improvements in compression efficiency and in image quality.

In such moving image coding technologies, the inter-frame prediction coding techniques which utilize temporal correlation between frames are widely used for the sake of efficient compression of the moving image signal. The inter-frame prediction coding involves predicting the image signal of the current frame from that of a previously-coded frame or frames, and encoding a prediction error signal between the predicted signal and the current signal. In typical moving images, the image signals of temporally neighboring frames are highly correlated. The techniques are thus effective in improving the compression efficiency.

The moving image coding technologies such as MPEG-1, MPEG-2, MPEG-4, and H.264 encode a moving image by the combination of I-pictures (intra coded pictures) which use no inter-frame prediction coding, P-pictures (unidirectionally predictive coded pictures) which use inter-frame prediction coding from a previously-coded frame, and B-pictures (bidirectionally predictive coded pictures) which use inter-frame prediction coding from two previously-coded frames.

In decoding, a single frame of an I-picture can be decoded by itself. A single frame of a P- or B-picture is not decodable by itself since it needs image data intended for inter-frame prediction before decoding.

FIG. 1 shows an example of picture configuration in a moving image coding system. Each individual rectangle represents a frame with the picture type and order of display indicated below (for example, B5 indicates that the frame is the fifth to be displayed and is encoded as a B-picture). Such I-, P-, and B-pictures of different characteristics are appropriately combined to encode the moving image.

FIG. 1 is a diagram showing an example of the picture configuration of the moving image coding. As shown in FIG. 1, when the coded moving image bit stream is subjected to special reproduction such as fast-play and fast reverse play, only the bit streams of I-pictures which are decodable by themselves are extracted from the bit stream for reproduction.

FIG. 2 is a diagram showing an example of operation for obtaining a fast play bit stream and a fast reverse play bit stream. FIG. 3 is a diagram showing the configuration of an apparatus that performs fast play and fast reverse play. As shown in FIG. 3, a bit stream is input to a stream extraction unit 101. The stream extraction unit 101 extracts only the bit streams of I-pictures from the input bit stream, and supplies the extracted bit streams to a stream rearrangement unit 102. The stream rearrangement unit 102 rearranges the supplied I-picture bit streams if needed, and outputs the bit streams to outside.

Description will now be given in conjunction with the example of FIG. 2. For fast play, only the bit streams of I-pictures are extracted by the stream extraction unit 101 in order from the bit stream shown in the top of FIG. 2. The extracted bit streams are arranged to constitute a bit stream, which results in the fast play bit stream shown in the lower left of FIG. 2. Fast play involves only the extraction of I-pictures without the rearrangement processing of the stream rearrangement unit 102.

For fast reverse play, the stream extraction unit 101 similarly extracts only the I-pictures from the bit stream. The stream rearrangement unit 102 rearranges and outputs the I-pictures in reverse order to that of display. This provides the fast reverse play bit stream shown in the lower right of FIG. 2.

For example, PTL 1 discloses a technical development of the foregoing method, in which only minimum necessary I-pictures for display are extracted to generate a fast play stream. The method of PTL 1 can also be used for the special reproduction of a bit stream that is encoded by the H.264 moving image coding technology which has recently been standardized. H.264, however, has a higher degree of freedom of coding than the coding standards of MPEG-1, MPEG-2, MPEG-4, etc. The application of the coding standard of MPEG-1, MPEG-2, or MPEG-4 is therefore not always possible. The details will be given below.

Unlike the coding standards of MPEG-1, MPEG-2, and MPEG-4, H.264 has two types of pictures that are composed only of I-slices and are decodable by themselves, namely, an IDR (Instantaneous Decoding Refresh) picture and an I-picture. The IDR-picture entails a reset operation on the internal state of the decoder, and is fully decodable by itself like the I-picture according to the coding standards of MPEG-2 etc.

On the other hand, the H.264 I-picture contains image data that is decodable by itself, but with a header part that needs information on past pictures for decoding. A simple way to implement special reproduction is thus to use IDR-pictures alone. As employed herein, an IDR-picture and an I-picture shall hereinafter refer to the H.264 IDR-picture and I-picture, respectively, unless otherwise specified.

Depending on the operation of the encoder, a bit stream with a small number of IDR-pictures and a large number of I-pictures can be generated for the sake of improving the coding efficiency etc. In such a case, the pictures available for the IDR-specific special reproduction are small in number, failing to provide a smooth motion.

FIG. 4 shows an example of the operation of a fast play bit stream with IDR-pictures alone. The original bit stream is shown in the top of FIG. 4, and a fast play bit stream in the bottom of FIG. 4. In the example, the original bit stream includes for every six frames a picture that contains image data reproducible by itself (IDR or I). Of such pictures, IDR-pictures occur at intervals of 18 frames. The rest are I-pictures.

As shown in FIG. 4, the exclusive use of IDR-pictures, without I-pictures whose image data is decodable by itself, degrades the motion smoothness of the fast play bit stream because only one in 18 frames is available for special reproduction. When I-pictures (other than IDR) are also used for special reproduction, past picture information is needed in order to decode the information on the header part (picture number, order of output, frame buffer management information, etc.) as described above. With IDR- and I-pictures extracted and arranged, it is not possible to decode the header part normally. This causes problems such as improper order of output of the pictures, and that the decoding apparatus judges it an error and provides a result of decoding.

For example, "frame_num" included in "slice_header( )" is defined to be incremented by one for each reference picture. When IDR- and I-pictures are extracted and arranged, "frame_num" can increase by more than 1 in value between adjoining reference pictures, which may be judged as an error by some decoding apparatuses.

To avoid such problems, the decoding apparatus may be provided with an operation mode for special reproduction. In the special reproduction mode, the decoding apparatus performs the decoding operation of simply outputting decoded image data in order of decoding, ignoring the header part' information on the order of output and a decoding error.

CITATION LIST

Patent Literature

{PTL 1} JP-A-05-344494

Non-Patent Literature

{NPL 1} ITU-T Recommendation H.264 "Advanced video coding for generic audiovisual services," May 2005

SUMMARY OF INVENTION

Technical Problem

As described above, the technique of providing the decoding apparatus with an operation mode for special reproduction can implement smooth special reproduction such as fast play and fast reverse play using I-pictures as well as IDR-pictures. However, since such a technique adds a new function to the decoding apparatus, the decoding apparatus using the technique and ones not will provide significantly different decoding results for an identical input bit stream.

The moving image coding technologies of the international standards such as MPEG-1, MPEG-2, MPEG-4, and H.264 strictly define the operations of the decoding apparatus. It is guaranteed that decoding apparatuses made by any manufactures provide almost or exactly the same decoding results for an identical input bit stream as long as the decoding apparatuses are in conformity to the standards. This is one of the significant advantages of the moving image coding technologies of the international standards. The technique to add a nonstandard function to the decoding apparatus is thus undesired for some use purposes.

The addition of a nonstandard function to the decoding apparatus also makes the decoding apparatus complicated in configuration, which can cause problems such as higher difficulties in design and manufacturing and higher cost. Between moving image coding apparatuses and decoding apparatuses, it is typically the decoding apparatuses that are used in greater numbers. The complication of the configuration of the decoding apparatus thus has a high impact.

An exemplary object of the present invention is to provide a moving image stream processing method and apparatus that can implement special reproduction such as fast play and fast reverse play without any modification to the decoding apparatus, a moving image reproduction apparatus using the same, and a moving image distribution apparatus.

Solution to Problem

An exemplary moving image stream processing apparatus according to the present invention includes:
an extraction unit that extracts, from a bit stream being a coded moving image, a first bit stream of a picture that is decodable by itself and a second bit stream of a picture whose image data part is decodable by itself but a part other than the image data part is not decodable by itself; and
a conversion unit that converts the second bit stream extracted by the extraction unit into a third bit stream of a picture that is decodable by itself,
the moving image stream processing apparatus arranging and outputting the first bit stream of the picture extracted by the extraction unit and the third bit stream in order of extraction or in reverse order to that of extraction.

Another exemplary moving image stream processing apparatus according to the present invention includes:
an extraction unit that extracts, from a bit stream being a coded moving image, a first bit stream of a picture that is decodable by itself, a second bit stream of a picture whose image data part is decodable by itself but a part other than the image data part is not decodable by itself, and a bit stream of a coding parameter set;
a storing unit that stores the extracted coding parameter set;
a generating unit that modifies the stored coding parameter set to generate a coding parameter set that adjusts a change in bit length of the part other than the image data part; and
a conversion unit that converts the second bit stream extracted by the extraction unit into a third bit stream of a picture that is decodable by itself based on the coding parameter set generated by the generating unit,
the moving image stream processing apparatus arranging and outputting the first bit stream extracted by the extraction unit and the third bit stream in order of extraction or in reverse order to that of extraction.

An exemplary moving image reproduction apparatus according to the present invention includes: the moving image stream processing apparatus; a moving image decoding apparatus that decodes a bit stream being a coded moving image; a bit stream switching apparatus that switches so as to supply an input bit stream to the moving image decoding apparatus when in normal reproduction, and supply the input bit stream to the moving image stream processing apparatus and supply a bit stream processed by the moving image stream processing apparatus to the moving image decoding apparatus when in special reproduction for fast play or fast reverse play; and a moving image display apparatus that displays a decoded image from the moving image decoding apparatus.

An exemplary storage medium according to the present invention contains: a bit stream being a coded moving image; a special reproduction bit stream that is processed by the moving image stream processing apparatus according to any one of claims 1 to 6; and a management table that contains information for associating the bit stream with the special reproduction bit stream.

An exemplary moving image distribution apparatus according to the present invention includes: the storage medium; a bit stream switching apparatus that reads the bit stream from the storage medium when in normal reproduction, and refers to the management table and reads the special reproduction bit stream associated with the bit stream when in special reproduction; and a bit stream sending apparatus that sends the bit stream read by the bit stream switching apparatus to a receiving terminal.

An exemplary moving image stream processing method according to the present invention includes:

extracting, from a bit stream being a coded moving image, a first bit stream of a picture that is decodable by itself and a second bit stream of a picture whose image data part is decodable by itself but a part other than the image data part is not decodable by itself;

converting the extracted second bit stream into a third bit stream of a picture that is decodable by itself; and arranging and outputting the extracted first bit stream and the third bit stream in order of extraction or in reverse order to that of extraction.

An exemplary moving image stream processing method according to the present invention includes:

extracting, from a bit stream being a coded moving image, a first bit stream of a picture that is decodable by itself, a second bit stream of a picture whose image data part is decodable by itself but a part other than the image data part is not decodable by itself, and a bit stream of a coding parameter set;

storing the extracted coding parameter set into a storing unit;

modifying the stored coding parameter set to generate a coding parameter set for adjusting a change in bit length of the part other than the image data part;

converting the extracted second bit stream into a third bit stream of a picture that is decodable by itself based on the generated coding parameter set; and arranging and outputting the extracted first bit stream and the third bit stream in order of extraction or in reverse order to that of extraction.

This application is the National Phase of PCT/JP2009/050958, filed Jan. 22, 2009, which is based upon and claims the benefit of priority from prior Japanese Patent Application No. 2008-013703, filed 24 Jan. 2008. The contents of Japanese Patent Application No. 2008-013703 will be incorporated in the contents of description of this application.

Advantageous Effects of Invention

According to the present invention, it is possible to achieve special reproduction such as fast play and fast reverse play with smoother motions. The reason is that while the conventional methods have not been capable of special reproduction of a picture whose image data part is decodable by itself but whose header part is not, the present invention converts such a picture into one that is fully decodable by itself, and uses the converted picture for special reproduction. The special reproduction bit stream is decodable even when input to ordinary decoding apparatuses. It is therefore possible to achieve special reproduction such as fast play and fast reverse play with smoother motions than heretofore by inputting and decoding the special reproduction stream in ordinary decoding apparatuses that have no additional function or the like for special reproduction.

{FIG.} 4 A diagram for explaining an example of operation according to the system of the background art.

Figure 5:
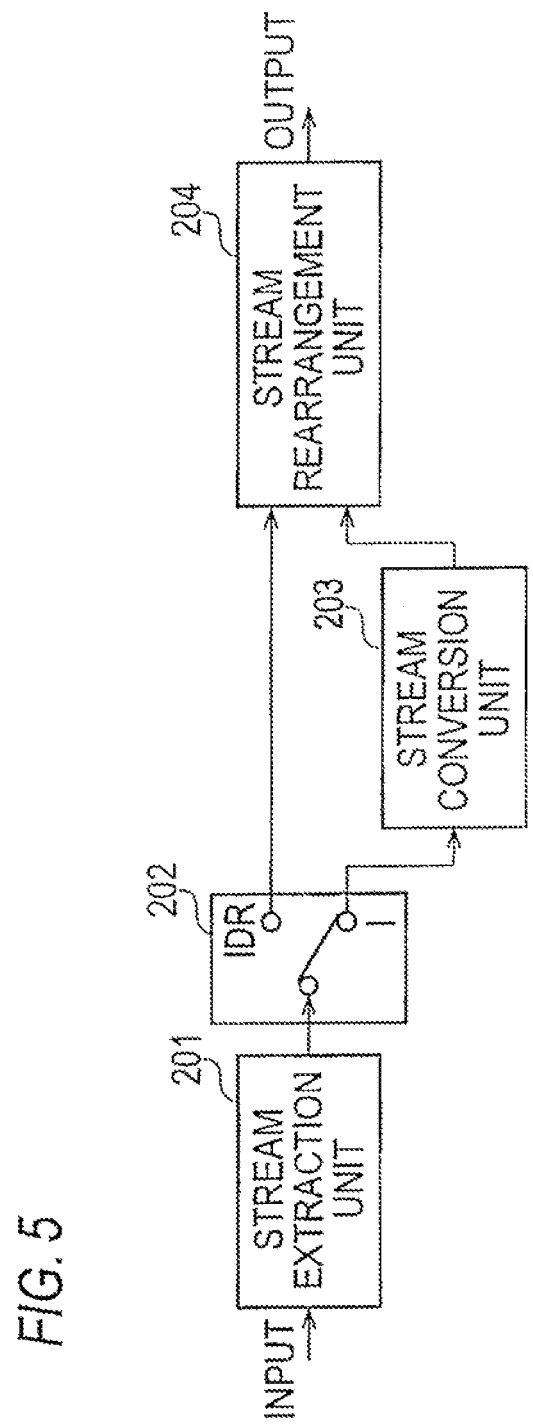

{FIG. 5} A block diagram showing the configuration of a first embodiment according to the present invention.

Figure 6:
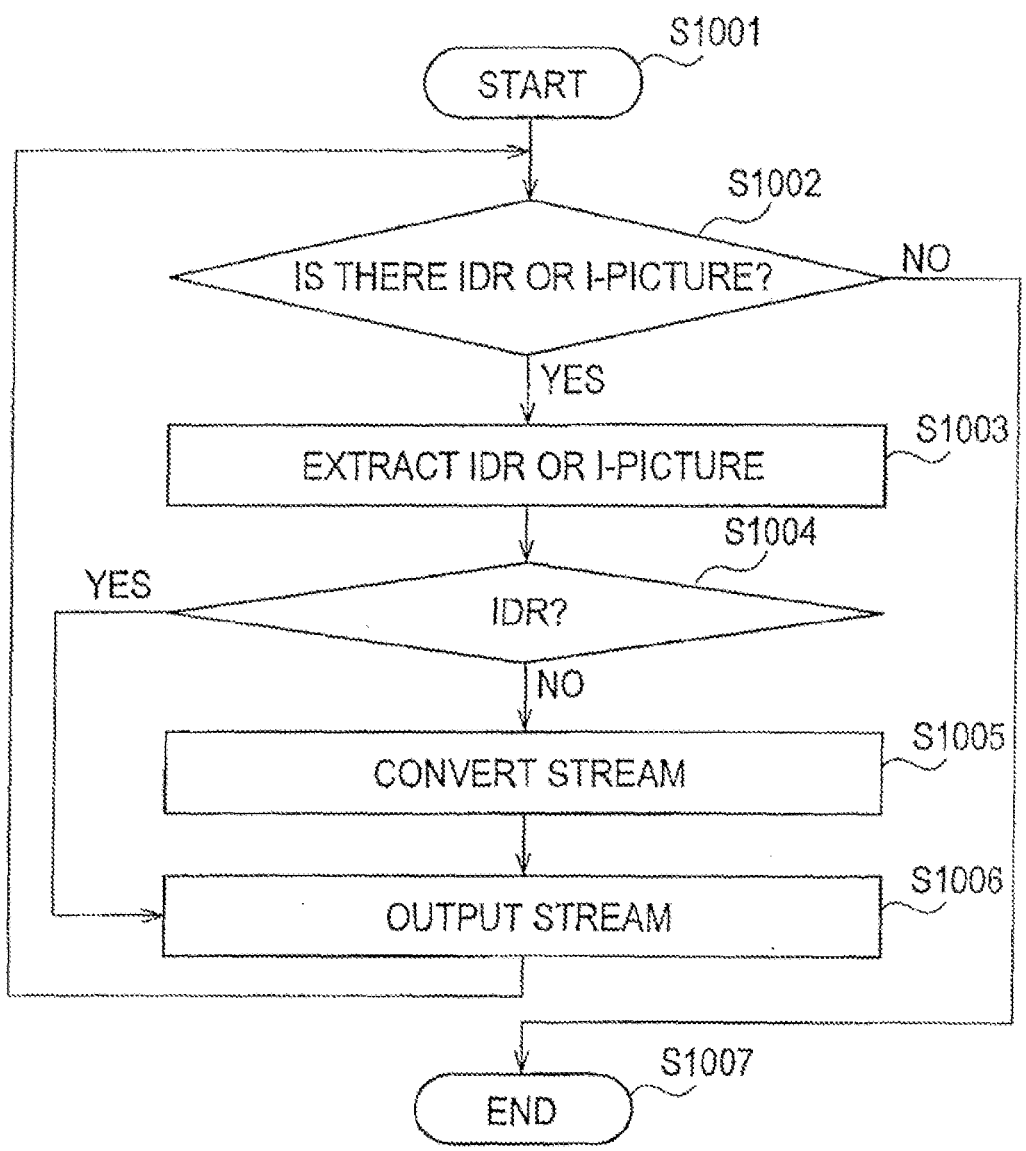

{FIG. 6} A flowchart showing the processing procedure of the first embodiment.

Figure 7:
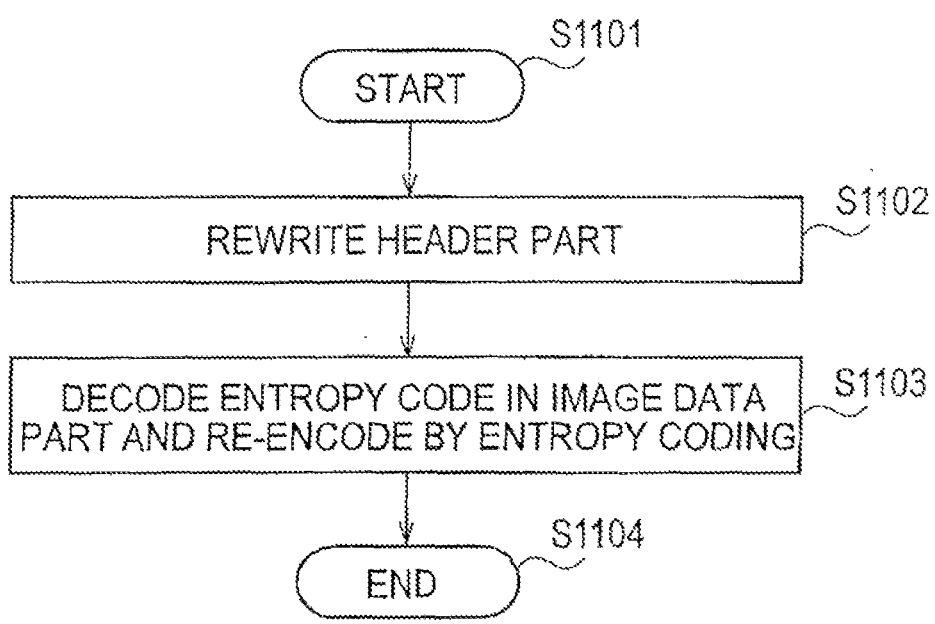

{FIG. 7} A flowchart showing the procedure of conversion processing from an I-picture to an IDR-picture.

Figure 8:
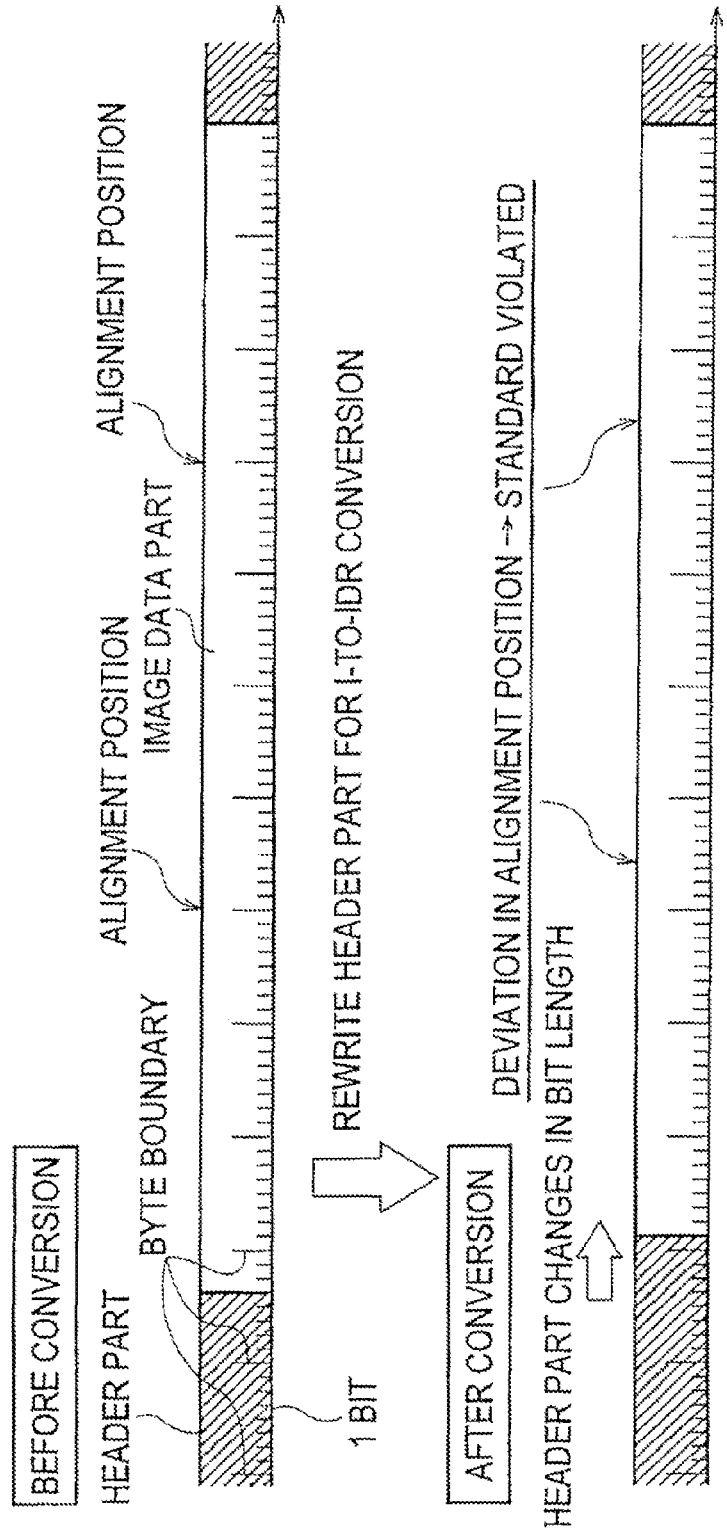

{FIG. 8} A diagram for explaining the operation of the first embodiment.

Figure 9:
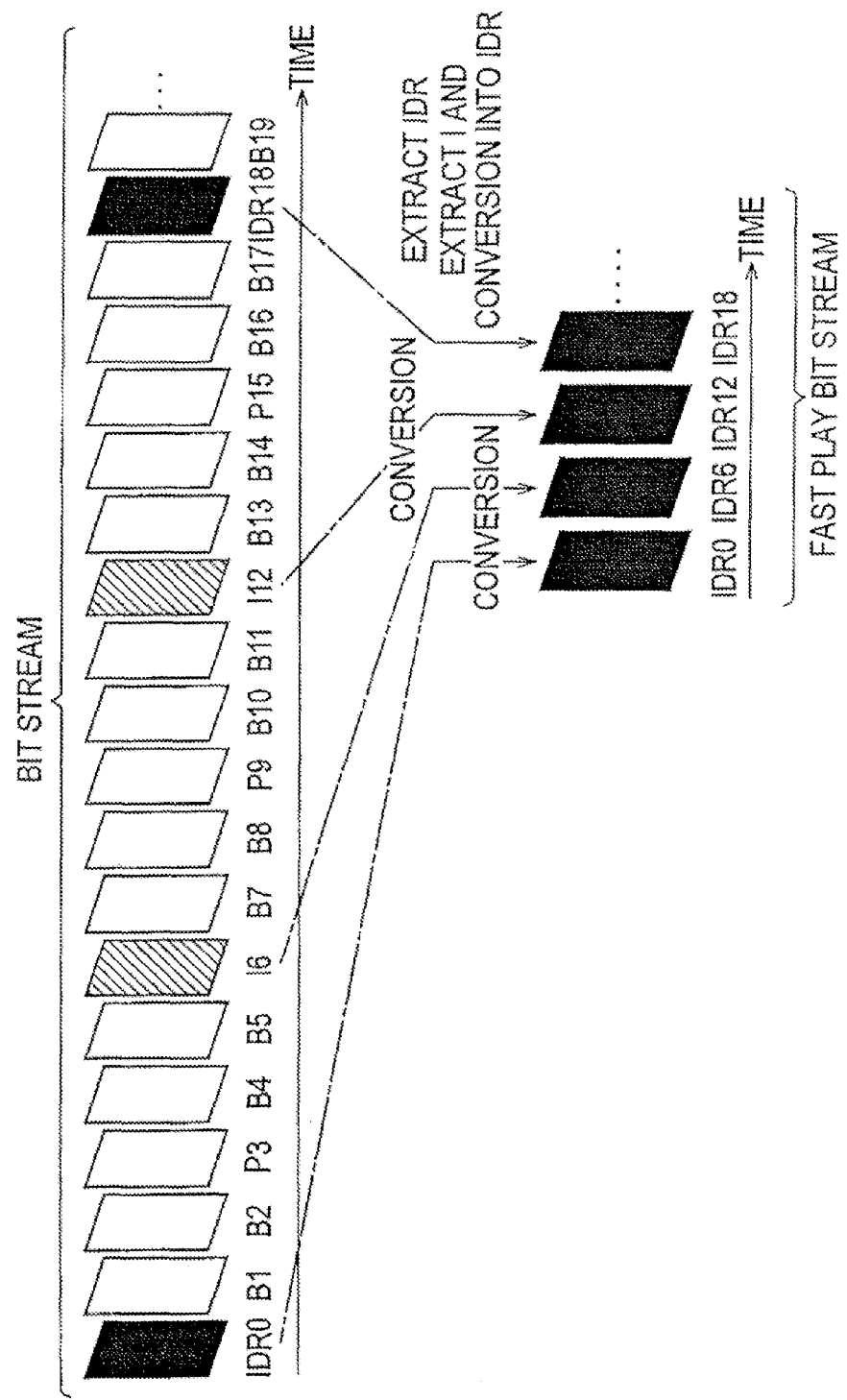

{FIG. 9} A diagram for explaining the operation of converting a bit stream into a fast play bit stream according to the first embodiment.

Figure 10:
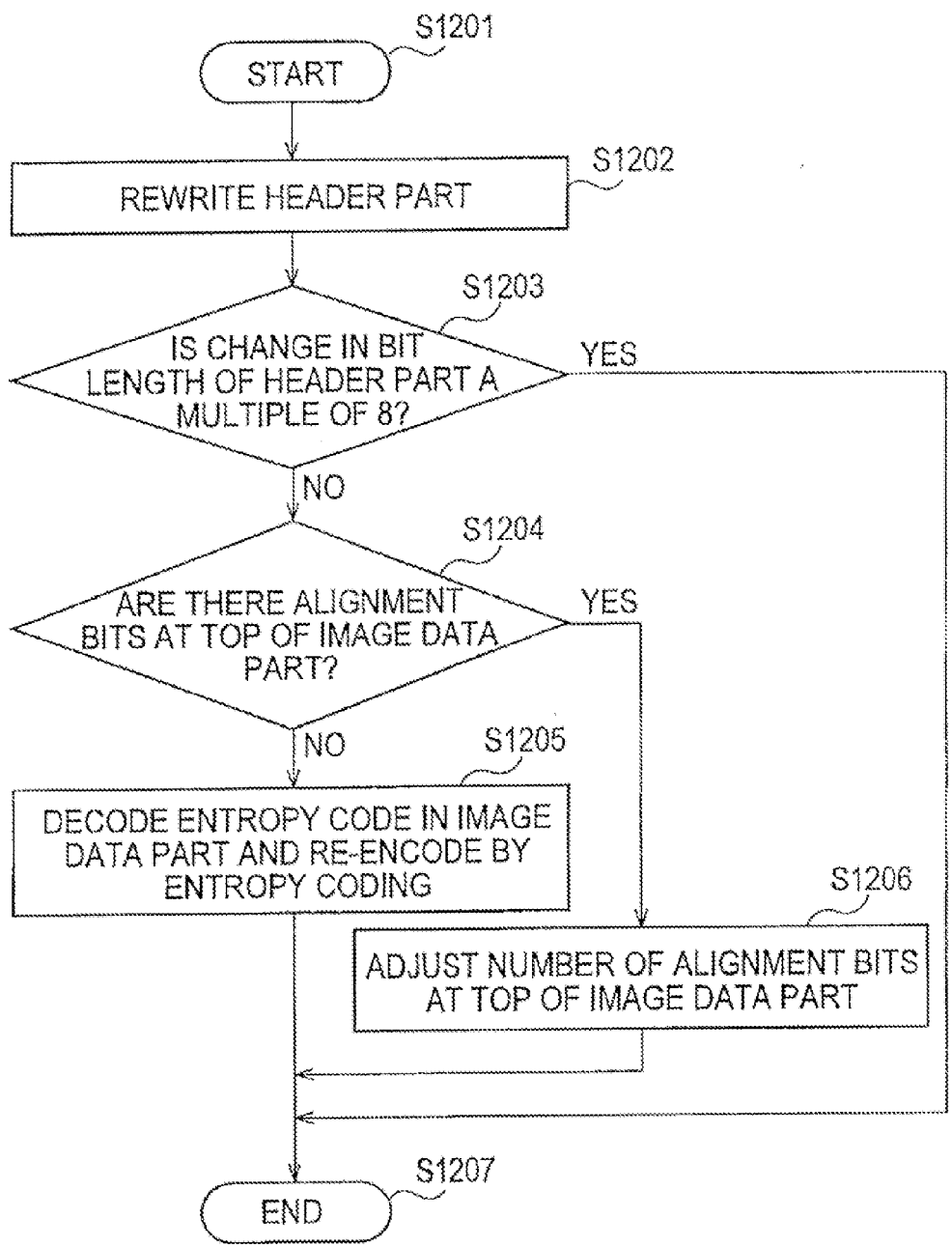

{FIG. 10} A flowchart showing the processing procedure of a second embodiment according to the present invention.

Figure 11:
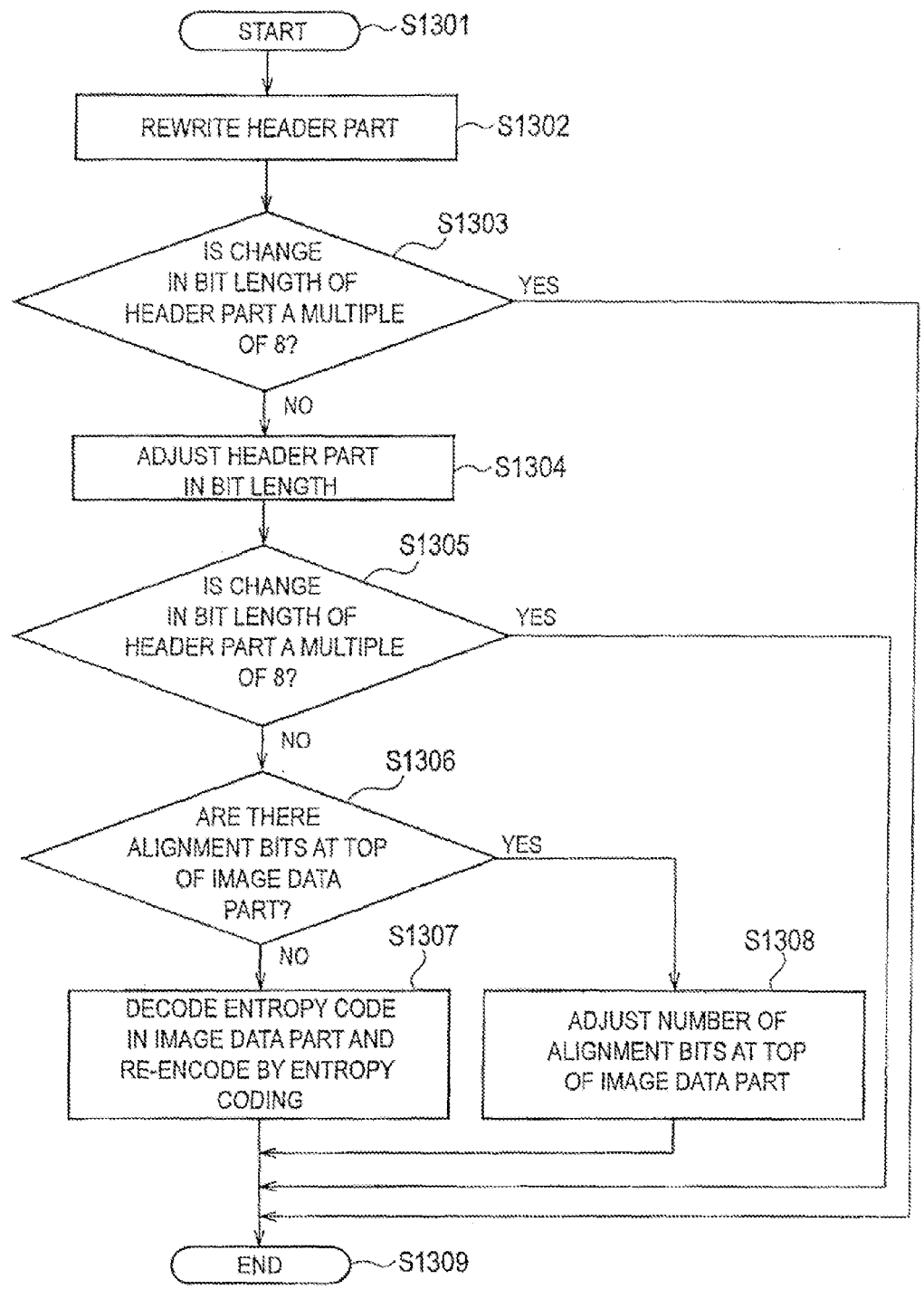

{FIG. 11} A flowchart showing the processing procedure of a third embodiment according to the present invention.

Figure 12:
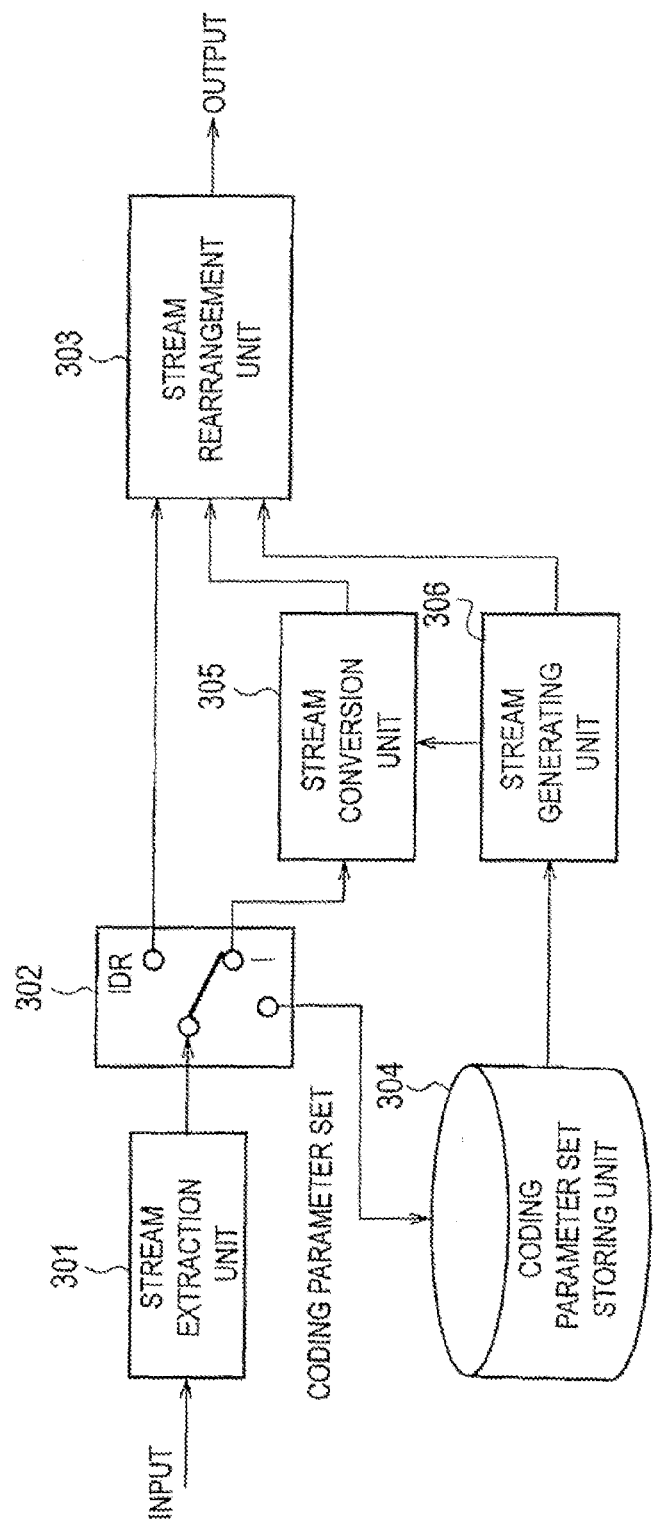

{FIG. 12} A block diagram showing the configuration of a fourth embodiment according to the present invention.

Figure 13:
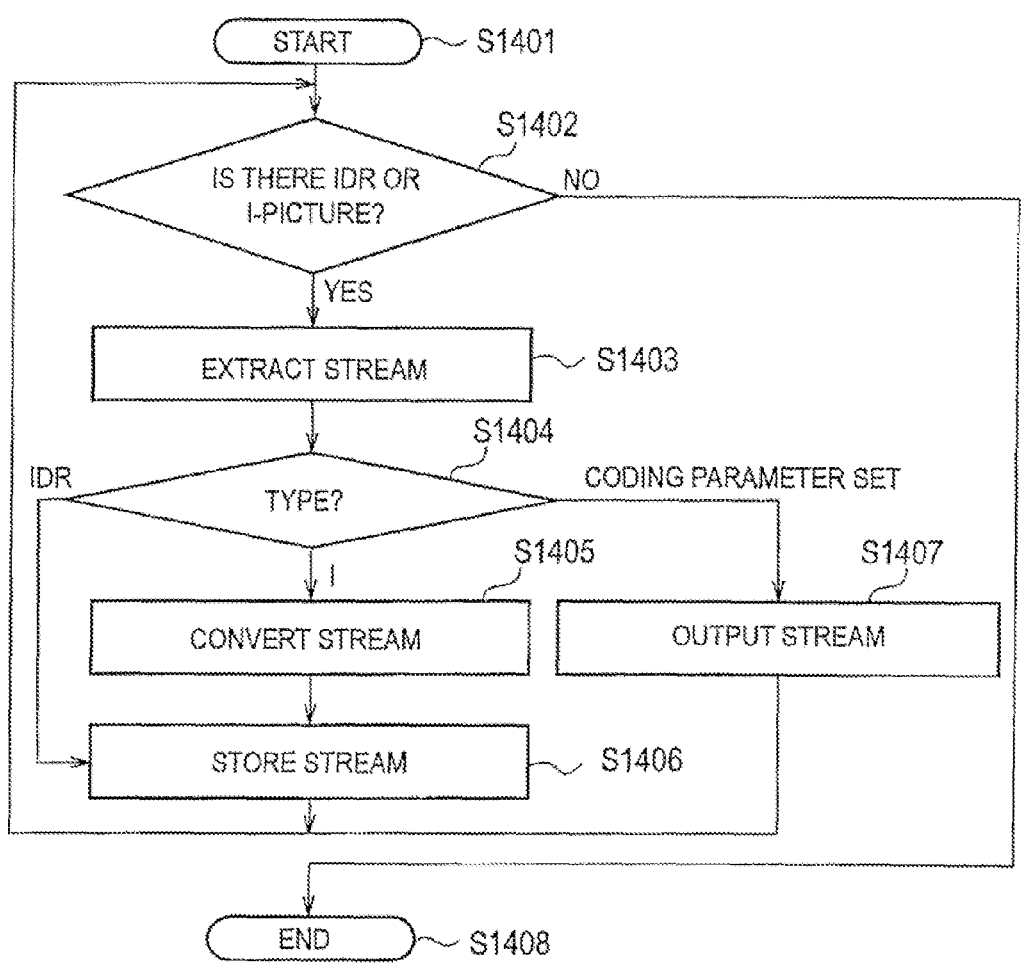

{FIG. 13} A flowchart showing the processing procedure of the fourth embodiment.

Figure 14:
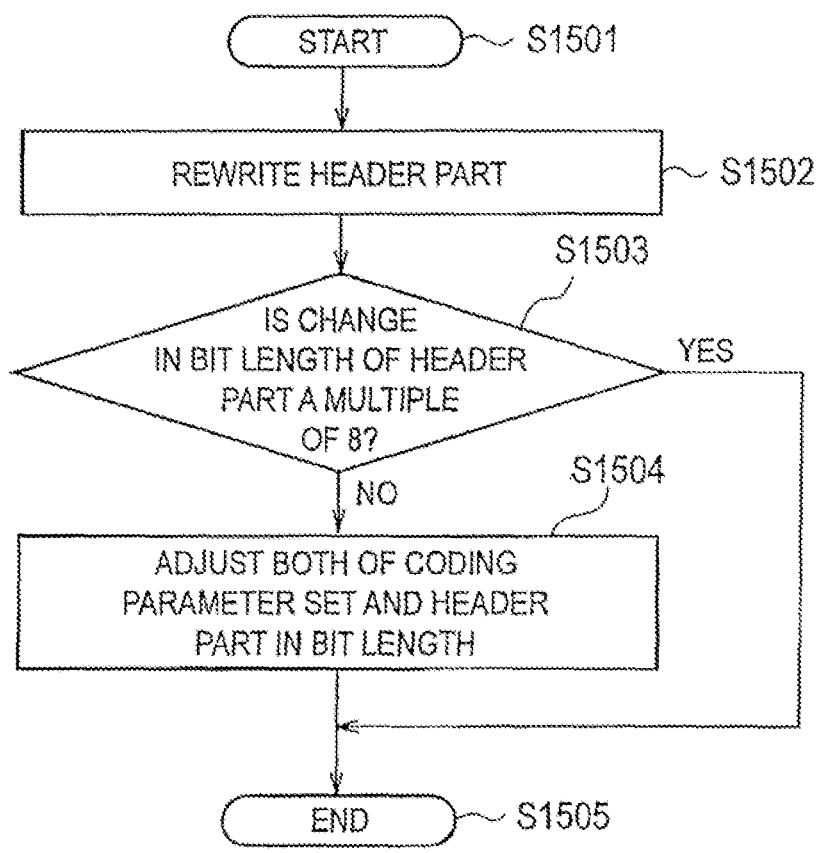

{FIG. 14} A flowchart showing the procedure of conversion processing from an I-picture to an IDR-picture according to the fourth embodiment.

Figure 15:
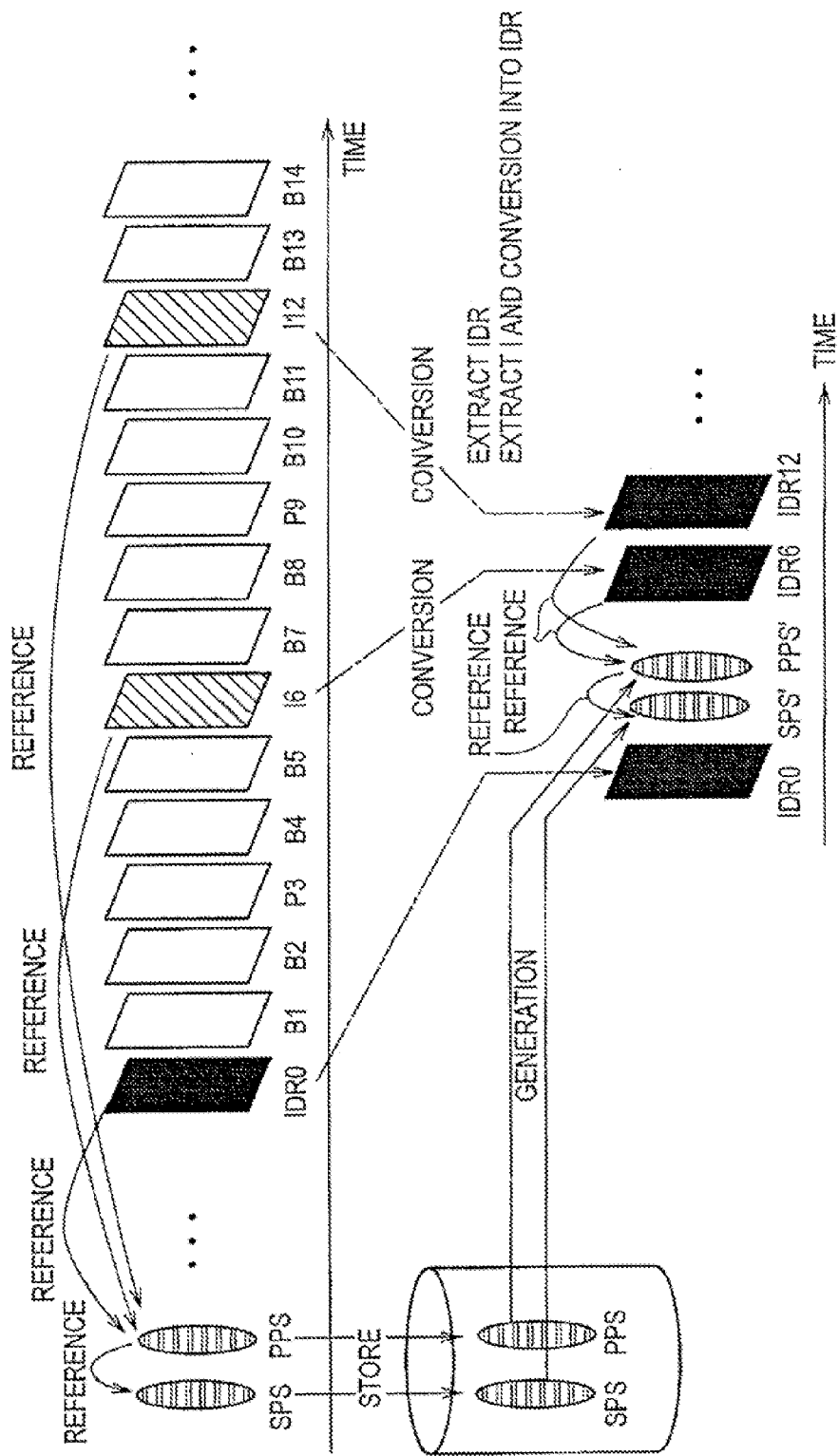

{FIG. 15} A diagram for explaining the operation of the fourth embodiment.

Figure 16:
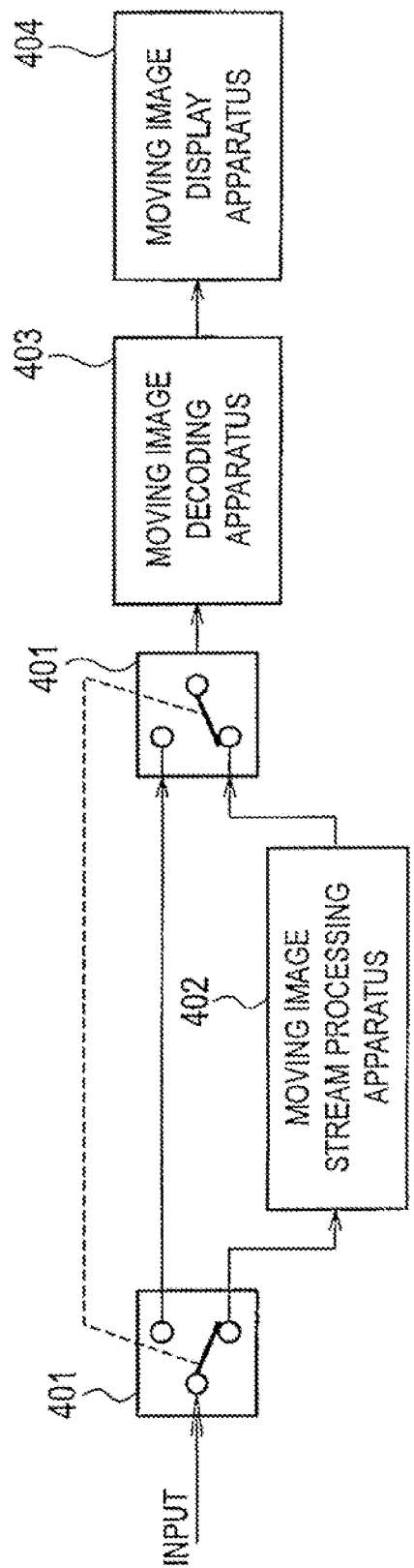

{FIG. 16} A block diagram showing the configuration of a fifth embodiment according to the present invention.

Figure 17:
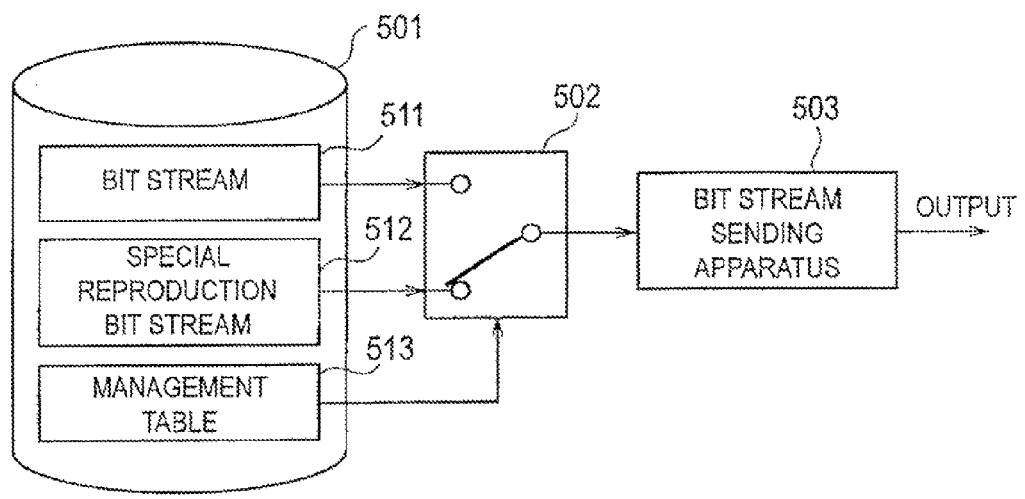

{FIG. 17} A block diagram showing the configuration of a sixth embodiment according to the present invention.

{FIG. 18} A diagram showing an example of a management table according to the sixth embodiment.

{FIG. 19} A diagram showing another example of the management table according to the sixth embodiment.

Figure 20:
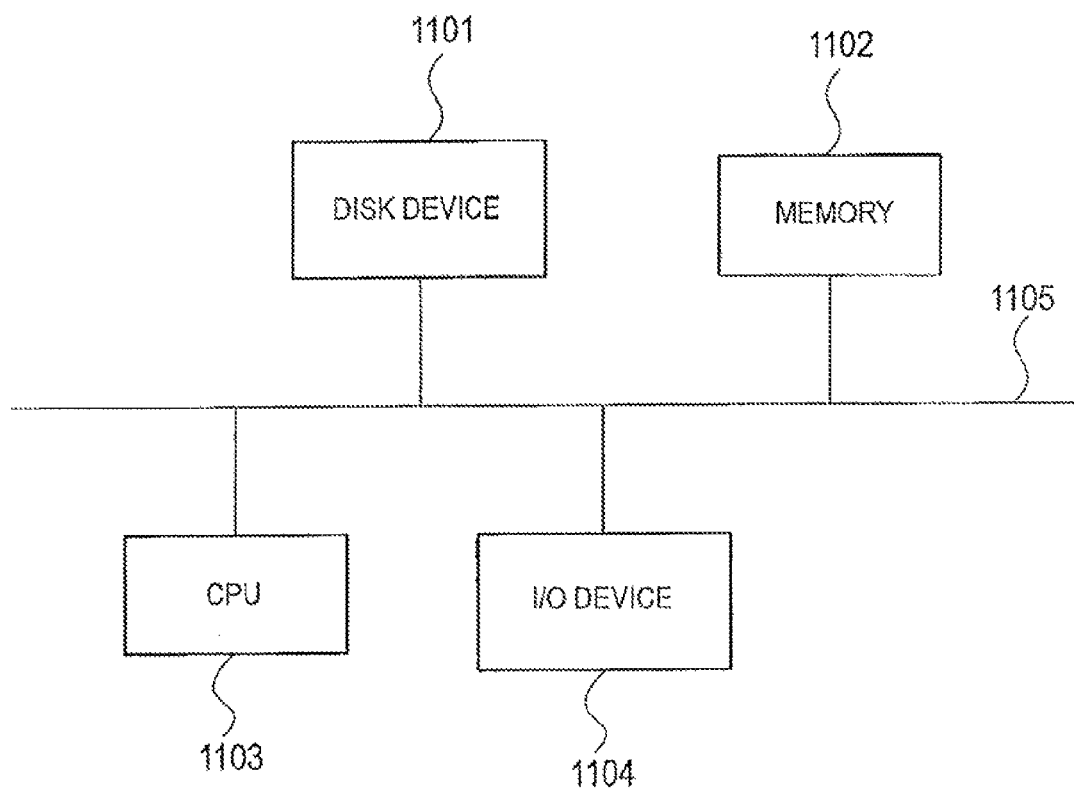

{FIG. 20} A block diagram showing an example of the configuration of a computer that constitutes a moving image stream processing apparatus according to the present embodiment.

DESCRIPTION OF EMBODIMENTS

Now, an exemplary mode for carrying out the invention will be described in detail with reference to the drawings. The following embodiments will be described with the H.264 system as an example.

[First Embodiment]

A first embodiment of the present invention will be described with reference to FIGS. 5 to 9. FIG. 5 is a block diagram showing the configuration of a moving image stream processing apparatus according to the first embodiment of the present invention. FIGS. 6 and 7 are flowcharts showing the operating procedure. FIGS. 8 and 9 are diagrams for explaining the outline of the operation.

Figure 1:
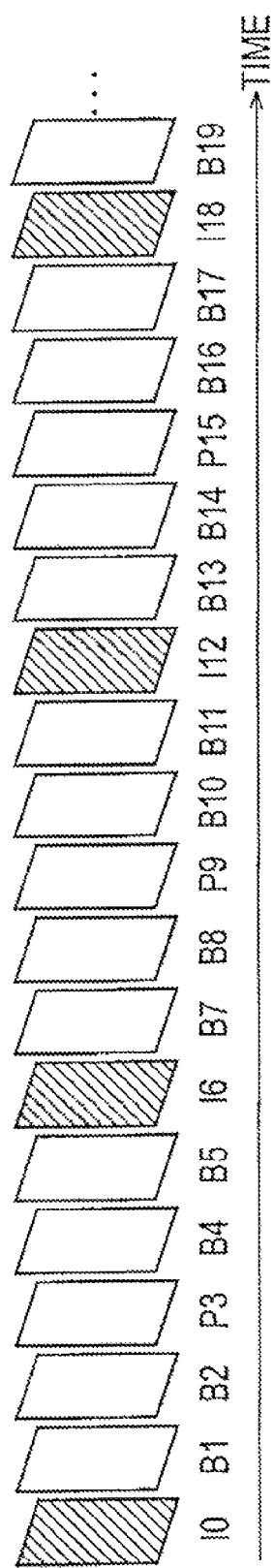
{FIG. 1} A diagram showing an example of picture configuration in moving image coding.
Figure 2:
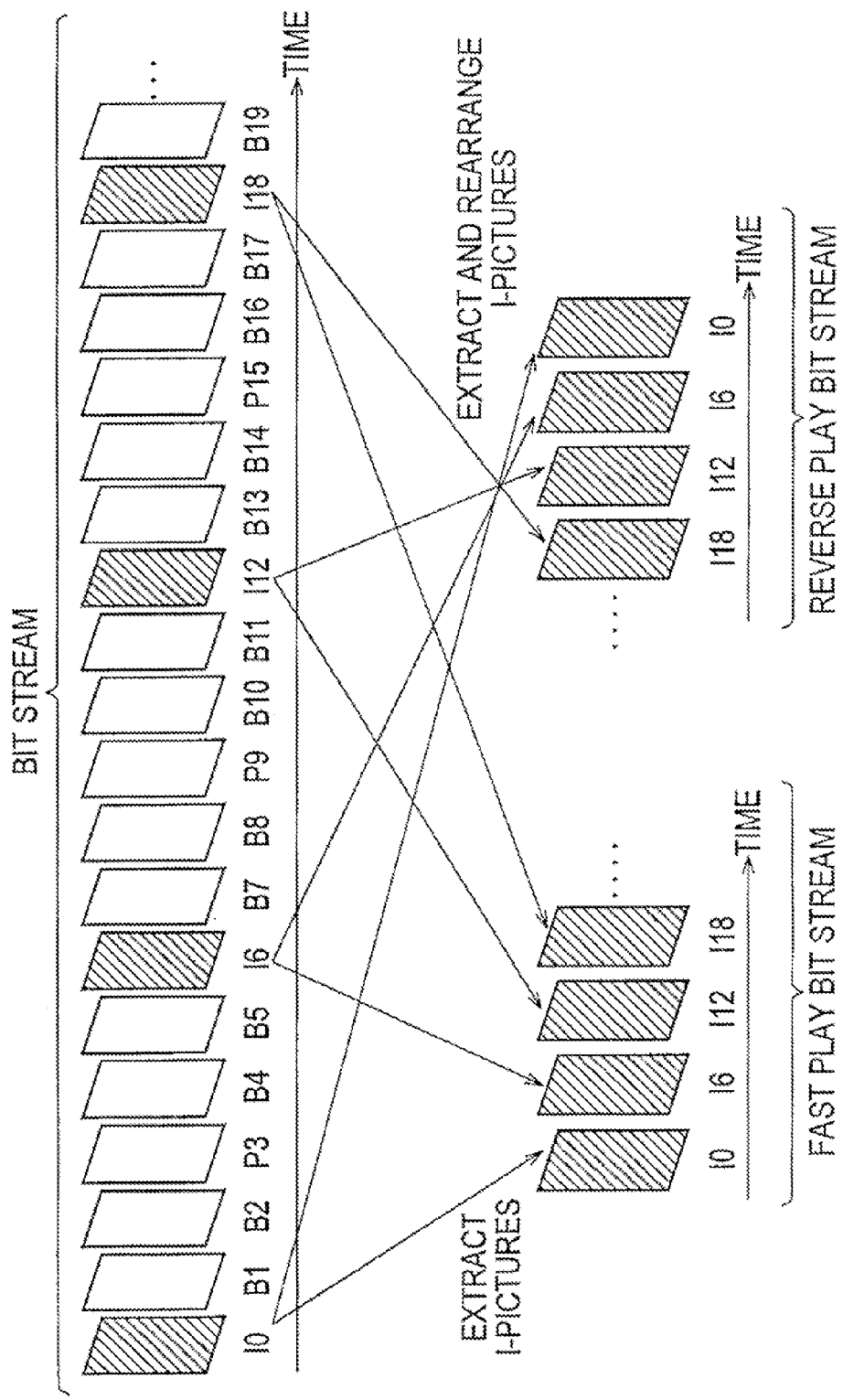
{FIG. 2} A diagram for explaining an example of operation according to a system of the background art.
Figure 3:
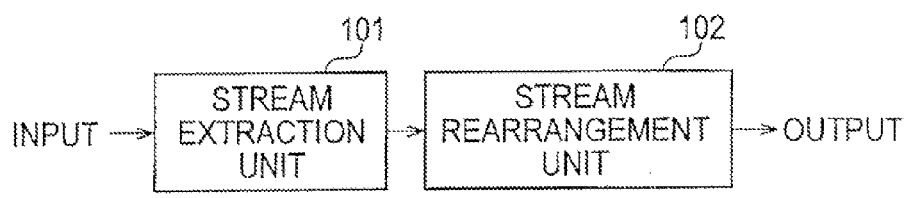
{FIG. 3} is a block diagram showing the configuration of the system of the background art.

As shown in FIG. 5, the present embodiment differs from the configuration of FIG. 3 in having a switching unit 202 and a stream conversion unit 203. The stream extraction unit 201 and the stream rearrangement unit 204 of FIG. 5 correspond to the stream extraction unit 101 and the stream rearrangement unit 104 of FIG. 3, respectively. The stream rearrangement unit 204 outputs pictures in order of extraction when in fast play, and outputs pictures in reverse order to that of extraction when in fast reverse play. Consequently, the stream rearrangement unit 204 functions as a bit stream output unit that generates and outputs a fast play bit stream or a fast reverse play bit stream.

The switching unit 202 switches depending on whether the stream supplied from the stream extraction unit 201 is an IDR-picture or an I-picture. More specifically, if the stream is an IDR-picture, the switching unit 202 simply supplies the stream to the stream rearrangement unit 204. If the stream is an I-picture, the switching unit 202 supplies the stream to the stream conversion unit 203. The stream conversion unit 203 converts the input stream of the I-picture into an IDR-picture.

The I-picture and the IDR-picture are the same as described in the background art. More specifically, the IDR-picture is fully decodable by itself like the I-picture of the conventional coding standards such as MPEG-2. The H.264 I-picture contains image data that is decodable by itself, but with a header part that needs information on past pictures for decoding. That is, with the H.264 system, the IDR-picture is made of an image data part that is decodable by itself while the I-picture includes an image data part that is decodable by itself but the part other than the image data part is not decodable by itself.

Next, the operation will be described with reference to FIG. 6. When the processing is started (step S1001), the stream extraction unit 201 initially reads the input bit stream (a bit stream being a coded moving image), and determines whether the image data part includes a picture that is decodable by itself (in the case of H.264, an IDR- or I-picture) (step S1002). With H.264, the coding type can be determined from slice_type in slice_header( ), for example. If there is no IDR- or I-picture, the processing proceeds to step S1007, where the operation is ended.

If there is an IDR- or I-picture, the stream extraction unit 201 extracts the stream of the IDR- or I-picture, and supplies the stream to the switching unit 202 (step S1003). The switching unit 202 switches connection depending on whether the input stream is an IDR-picture or an I-picture (step S1004). If the input stream is an IDR-picture, the switching unit 202 simply supplies the stream to the stream rearrangement unit 204 (step S1006). If the stream is an I-picture, the switching unit 202 supplies the stream to the stream conversion unit 203.

The stream conversion unit 203 converts the input stream of the I-picture into an IDR-picture (step S1005), and supplies the resulting stream of the IDR-picture to the stream rearrangement unit 204. The stream rearrangement unit 204 performs necessary rearrangement processing on the input streams, and outputs the streams (step S1006). The processing then returns to step S1002 to search the input bit stream for a next IDR- or I-picture. If there is no IDR- or I-picture, the processing ends at step S1007.

The necessary rearrangement processing of the stream rearrangement unit 204, in fast play, refers to arranging IDR-pictures in order of extraction to obtain a fast play bit stream as shown in FIG. 9. In fast reverse play, the necessary rearrangement processing refers to rearranging the IDR-pictures in reverse order to that of FIG. 9 to obtain a fast reverse play bit stream.

The stream conversion unit 203, as described above, converts the input stream of the I-picture into an IDR-picture. The operation will be described in detail with reference to FIGS. 7 and 8. FIG. 7 is a flowchart showing the operation. FIG. 8 is a diagram for explaining the operation. In FIG. 7, the processing starts at step S1101.

In the H.264 system, the IDR-picture and the I-picture have different stream syntaxes in the bits above the header part (slice_header( )), and necessary overwriting is thus performed (step S1102).

Specific examples include the following methods (1) to (5):
(1) Modify "nal_ref_idc" in "nal_unit( )" to 5;
(2) Add "idr_pic_id" to "slice_header( )";
(3) Modify "frame_num" in "slice_header( )" to 0;
(4) Modify an associated code word so that POC (Picture Order Count) in "slice_header( )" becomes 0 in value; and
(5) Modify the contents of "dec_ref_pic_marking( )" to the IDR-picture syntax. For example, rewrite so that "no_output_of_prior_pics_flag"=0 and "long_term_reference_flag"=0.

The stream contents of the image data part (slice_data( )) have no difference between the IDR-picture and the I-picture, which entails no modification to the contents. It should be noted that certain H.264 code words are defined to have their start position or end position at a byte boundary (byte alignment position). For example, the top of "pcm_sample_luma" included in "slice_data( )" needs to exist at a byte alignment position. The end of "rbsp_trailing_bits( )" needs to exist at a byte alignment position.

Depending on the contents of overwriting of the header part, "slice_header( )" can be changed in bit length. In such a case, the subsequent bit stream that follows "slice_data( )" varies in bit position as much as the change in the bit length of "slice_header( )". As a result, code words that are subject to the byte alignment requirement can vary in bit position and sometimes fail to satisfy the byte alignment requirement.

FIG. 8 shows an example of such an operation. The horizontal axis of FIG. 8 indicates the bit position in a bit stream. The minor ticks indicate positions in units of one bit, the major ticks in units of eight bits. In the example, the header part before conversion extends up to the fifth bit of the second byte in FIG. 8, followed by an image data part. The image data part includes code words that are subject to the byte alignment requirement at positions indicated by the filled triangles. If the header part of the stream is overwritten and the resulting header part is four bits longer, the entire stream after the conversion is shifted by four bits afterward as shown in FIG. 8. Consequently, the code words to be byte-aligned are off the alignment positions, which results in a standard-violating stream.

To avoid such a problem, the image data part is once decoded by entropy coding (in H.264, CAVLC or CABAC) and entropy coded again with necessary corrections for matching with the byte alignment specification (step S1103). For example, in the case of "pcm_sample_luma", the number of "pcm_alignment_zero_bit" immediately before is adjusted to satisfy the byte alignment specification upon the entropy re-encoding.

Alternatively, the number of bits of "cabac_alingment_one_bit" and the number of bits of "rbsp_alignment_zero_bit" may be adjusted, for example. As far as the image data part is concerned, the conversion from an I-picture into an IDR-picture is completed by only performing such stream shaping processing for byte alignment (step S1104). Although omitted for the sake of simplicity, the foregoing conversion processing is performed on all slices that are included in the picture.

Figure 4:
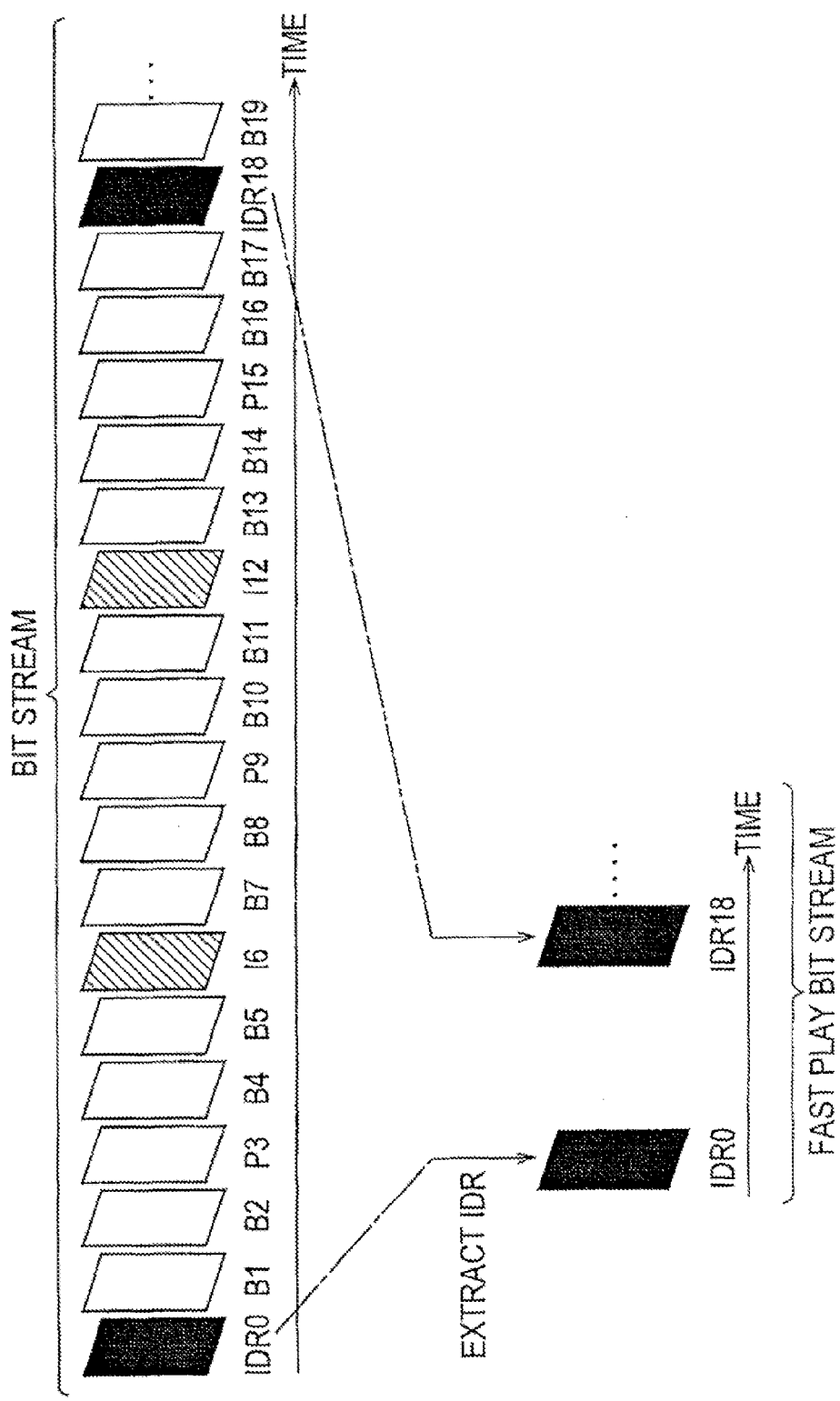

Next, an example of operation when the same stream as in FIG. 4 is input will be described with reference to FIG. 9. The operation shown in FIG. 4 uses only IDR-pictures for the generation of the fast play stream. In that example, there are only two pictures available, which impairs the motion smoothness.

FIG. 9 is a diagram showing an example of the operation in the present embodiment. The original bit stream is shown in the top of FIG. 9, and a fast play bit stream in the bottom of FIG. 9. In the example of operation of the present embodiment, as shown in FIG. 9, the I-pictures (I6 and I12) of the input bit stream are also used for the fast play stream in addition to the two IDR-pictures (IDR0 and IDR18). When using the I-pictures, the stream conversion unit 203 converts the I-pictures into IDR-pictures (IDR6 and IDR12) for use. This can increase the number of pictures available for fast play, thereby achieving smoother special reproduction.

In the present embodiment, the streams of the IDR-pictures and I-pictures are extracted, and the I-pictures are converted into IDR-pictures before used to generate a special reproduction bit stream. It is therefore possible to use more pictures for special reproduction than in the background art. Since the special reproduction uses only IDR-pictures including ones converted from I-pictures, each of the pictures is fully decodable by itself. A proper bit stream in conformity to the standard can thus be obtained even after the rearrangement etc. Consequently, it is possible to provide a moving image stream processing apparatus and method that can implement smoother special reproduction such as fast play and fast reverse play without changing the decoding apparatus.

[Second Embodiment]

Now, a second embodiment of the present invention will be described. FIG. 10 is a flowchart showing the operating procedure of the second embodiment. A moving image stream processing apparatus according to the present embodiment has the same configuration as that of the first embodiment. The overall processing flowchart is the same as that of FIG. 6. A difference from the first embodiment lies in the conversion processing of the stream conversion unit 203. FIG. 10 shows the operation of the stream conversion unit 203.

In FIG. 10, the processing starts at step S1201. After the overwriting of the bits above the header part (step S1202), it is determined whether the change in the bit length of the header part caused by the overwriting is a multiple of 8 (step S1203). In the present embodiment, 0 shall also be considered as a multiple of 8. The same holds for the subsequent embodiments.

If the change is a multiple of 8, the stream of the image data part is shifted by the multiple of 8 in bit position. In such a case, there occurs no deviation in the byte alignment position of each code word in the image data part. No further processing is thus needed for the image data part (end at S1207), and the input stream is simply output.

On the other hand, if the change in the bit length of the header part is not a multiple of 8, it is determined whether there are any bits for byte alignment matching at the top of the image data part (step S1204). If so, the number of bits is adjusted for byte alignment (step S1206). With H.264 using CABAC for entropy coding, there is a code word "cabac_alignment_one_bit" intended for byte alignment at the top of the image data part (slice_data( )). The number of bits of the "cabac_alignment_one_bit" is adjusted for adjusting byte alignment.

The byte alignment properly matched here ensures that the subsequent stream of the image data part is free from a deviation in the byte alignment position. No further processing is thus needed, and the input stream is simply output. On the other hand, if CABAC is not used for entropy coding (there is no alignment bit at the top of the image data part), the image data part is decoded and re-encoded by the entropy coding as in the first embodiment (S1205).

In the present embodiment, no processing will be performed if the conversion of an I-picture into an IDR-picture causes a change in the bit length of the header part as much as a multiple of 8. If the change is not a multiple of 8 and CABAC is used for entropy coding, the entropy coding-based decoding and re-encoding are omitted or replaced with simpler processing.

Consequently, it is possible to solve the problem with byte alignment. In the first embodiment, the entropy coding-based decoding and re-encoding processing is performed all the time with high computational load. In the present embodiment, such processing is omitted as much as possible, whereby special reproduction such as fast play and fast reverse play can be achieved with lower computing load.

[Third Embodiment]

Next, a third embodiment of the present invention will be described. FIG. 11 is a flowchart showing the operating procedure of the third embodiment. A moving image stream processing apparatus according to the present embodiment has the same configuration as that of the first and second embodiments. The overall processing flowchart is the same as that of the first embodiment shown in FIG. 6. A difference from the first and second embodiments lies in the conversion processing of the stream conversion unit 203. FIG. 11 shows the operation of the stream conversion unit 203.

The processing of steps S1301 to S1303 of FIG. 11 is the same as that of steps S1201 to S1203 in the flowchart of the second embodiment (FIG. 10). The difference lies in the processing when the change in the bit length of the header part is not a multiple of 8 at step S1303.

In the present embodiment, it is attempted to modify part of a code word in the header part (slice_header( )) so that the change in the bit length of the header part becomes a multiple of 8 (step S1304). For example, the code word "idr_pic_id" in "slice_header( )" of the IDR-picture can be modified within the range of 0 to 65535 in value. Depending on the value, the bit length varies in units of two bits.

Using such a technique, when the change in the bit length of the header part is 2, 4, or 6 bits, an appropriate value of "idr_pic_id" can be selected to further adjust the bit length in units of two bits so that the change in the bit length of the header part becomes a multiple of 8. Subsequently, it is determined again whether the change in the bit length of the header part is a multiple of 8 (step S1305). If the change is a multiple of 8, the conversion processing will not be performed further. The processing when the adjustment of step S1304 fails to adjust the change in the bit length to a multiple of 8 (steps S1306 to S1308) is the same as that of steps S1204 to S1206 in the flowchart of the second embodiment (FIG. 10).

In the present embodiment, when converting an I-picture into an IDR-picture, it is attempted to adjust the value of a code word in the header part so that the change in the bit length of the header part becomes a multiple of 8 if the change in the bit length is not a multiple of 8. Such an attempt can reduce the chances for the entropy coding-based decoding and re-encoding processing of high computational load to be needed, so that special reproduction such as fast play and fast reverse play can be achieved with lower computational load.

[Fourth Embodiment]

Now, a fourth embodiment of the present invention will be described with reference to FIGS. 12, 13, and 14. FIG. 12 is a block diagram showing the configuration of a moving image stream processing apparatus according to the present embodiment. FIGS. 13 and 14 are flowcharts showing the operating procedure of the present embodiment.

A stream extraction unit 301, switching unit 302, stream rearrangement unit 303, and stream conversion unit 305 shown in FIG. 12 correspond to the stream extraction unit 201, switching unit 202, stream rearrangement unit 204, and stream conversion unit 203 of FIG. 5, respectively. The functions are the same. Note that the switching unit 302, as will be described later, supplies an extracted stream to a coding parameter set storing unit 304 if the stream is of a coding parameter set.

The present embodiment differs from the first embodiment in the addition of the coding parameter set storing unit 304 and a stream generating unit 306. The coding parameter set storing unit 304 stores the supplied stream.

Next, the operation will be described with reference to FIG. 13. When the processing is started (step S1401), the stream extraction unit 301 reads the input bit stream (a bit stream being a coded moving image), and determines whether the image data part includes a picture that is decodable by itself (in the case of H.264, an IDR- or I-picture) (step S1402).

If there is no IDR- or I-picture, the processing proceeds to step S1408, where the operation is ended. If there is an IDR- or I-picture, the stream extraction unit 301 extracts the necessary stream (step S1403). Here, the stream extraction unit 301 extracts the stream of a coding parameter set aside from the IDR or I-picture. The coding parameter set is a set of groups of various parameters that are needed for picture decoding. Examples of such a coding parameter set in H.264 include "seq_parameter_set_rbsp( )" and "pic_parameter_set_rbsp( )".

The extracted stream is supplied to the switching unit 302. The switching unit 302 switches connection depending on the type of the input stream (IDR-picture, I-picture, or coding parameter set) (step S1404). If the stream is an IDR-picture, the switching unit 302 simply supplies the stream to the stream rearrangement unit 303. If an I-picture, the stream is supplied to the stream conversion unit 305. If a coding parameter set, the stream is supplied to the coding parameter set storing unit 304. The coding parameter set storing unit 304 stores the input stream (step S1407).

The stream conversion unit 305 converts the input stream of the I-picture into an IDR-picture (step S1405), and supplies the resulting stream of the IDR-picture to the stream rearrangement unit 303. In the conversion, the coding parameter set stored in the coding parameter set storing unit 304 is read and supplied to the stream generating unit 306 if necessary. A stream generated by the stream generating unit 306 is also supplied to the stream rearrangement unit 303.

The stream rearrangement unit 303 performs necessary rearrangement processing on the input streams and outputs the streams as in the foregoing embodiments (step S1406). The processing then returns to step S1402 to search the input bit stream for a next IDR or I-picture. The processing ends at step S1408.

The stream conversion unit 305 converts the input I-picture into an IDR-picture. The operation will be described in detail with reference to the flowchart of FIG. 14. The processing for the modification of the head part (step S1502) and the determination on the change in the bit length of the header part (step S1503) is the same as that of steps S1302 and S1303 of the third embodiment (FIG. 11). In the present embodiment, if the change in the bit length of the header part is not a multiple of 8, both the header part (slice_header( )) and the coding parameter set are adjusted (S1504). Then, the processing is ended (S1505).

If the number of bits to be adjusted is an even number, the adjustment can be made by modifying the value of a code word in "slice_header( )" as in step S1304 of the third embodiment (FIG. 11). On the other hand, if the number of bits to be adjusted is an odd number, it is not possible to make the adjustment by the method alone. In such a case, for example, the bit length of the code word "frame_num" in "slice_header( )" is modified for adjustment.

The bit length of "frame_num" is determined by the value of the code word "log2_max_frame_num_minus4" in "seq_parameter_set_rbsp( )". When the bit length of "frame_num" is to be adjusted, active "seq_parameter_set_rbsp( )" and "pic_parameter_set_rbsp( )" are thus read from the coding parameter set storing unit 304. The stream generating unit 306 generates "seq_parameter_set_rbsp( )" that has "log2_max_frame_num_minus4" modified in value, and "pic_parameter_set_rbsp( )" that makes reference thereto.

The code words other than "log2_max_frame_num_minus4" may have the same values as before modification. Such code words as "seq_parameter_set_id" and "pic_parameter_set_id" may also be modified if needed. The stream conversion unit 305 rewrites "slice_header( )" so as to make reference to the "seq_parameter_set_rbsp( )" and "pic_parameter_set_rbsp( )" generated by the stream generating unit 306.

For example, the processing of modifying "log2_max_frame_num_minus4" for an odd number of bits of adjustment and modifying "idr_pic_id" for an even number of bits of adjustment is performed as a whole. By such processing, it is possible to adjust the change in the bit length of the header part from any value to a multiple of 8. The adjustment processing prevents deviations occurring in the byte alignment positions of the image data part. The input stream of the image data part is thus simply output.

FIG. 15 is a diagram showing the foregoing operation of the stream conversion unit 305, the stream generating unit 306, etc. FIG. 15 shows a bit stream being a coded moving image that is input to the stream extraction unit 301 and bit streams that are supplied to the stream rearrangement unit 303. In FIG. 15, SPS and PPS represent "seq_parameter_set_rbsp( )" and "pic_parameter_set_rbsp( )", respectively. In the example of FIG. 15, the PPS of the input bit stream makes reference to the SPS. Such pictures as IDR0, I6 and I12 make reference to the PPS.

In the present embodiment, the SPS and PPS are stored in the coding parameter set storing unit 304. When generating a fast play bit stream, as shown in FIG. 15, the stream conversion unit 305 converts the I-pictures I6 and I12 into IDR-pictures IDR6 and IDR12, respectively.

If in the conversion the frame_num in "slice_ header( )" needs to be adjusted in bit length, the SPS and PPS are read from the coding parameter set storing unit 304. The stream generating unit 306 then generates "seq_parameter_set_rbsp( )" (SPS') that has "log2_max_frame_num_minus4" modified in value, and "pk_parameter_set_rbsp( )" (PPS') that makes reference thereto.

Specifically, when the stream conversion 305 performs the conversion into the pictures IDR6 and IDR12 as shown in FIG. 15, the value of "log2_max_frame_num_minus4" is modified so that the bit length (change in the bit length) of the part other than the image data part of the picture becomes a multiple of 8.

The stream conversion unit 305 outputs IDR6 and IDR12 while overwriting "slice_header( )" so as to make reference to the SPS' and PPS' generated by the stream generating unit 306. The SPS', PPS', IDR6, and IDR12 are supplied to the stream rearrangement unit 303 with IDR0, and are used for a fast play bit stream for fast play, fast reverse play, etc.

In the present embodiment, when an I-picture is converted into an IDR-picture, the change in the bit length of the header part is adjusted by generating a coding parameter set with modified values if needed. This makes it possible to adjust the change in the bit length of the header part from any value to a multiple of 8, which eliminates the need for the entropy coding-based decoding and re-encoding processing of high computational load. It is therefore possible to provide a moving image stream processing apparatus and method that can implement special reproduction such as fast play and fast reverse play with lower computational load.

[Fifth Embodiment]

Next, description will be given of a moving image reproduction apparatus which is a fifth embodiment of the present invention. FIG. 16 is a block diagram showing the configuration of the fifth embodiment. A moving image stream processing apparatus 402 is the moving image stream processing apparatus that is described in any one of the first to fourth embodiments. In normal reproduction, a bit stream switching apparatus 401 supplies the input bit stream directly to a moving image decoding apparatus 403. In special reproduction such as fast play and fast reverse play, the bit stream switching apparatus 401 supplies the input bit stream to the moving image stream processing apparatus 402, and supplies the output bit stream of the moving image stream processing apparatus 402 to the moving image decoding apparatus 403.

The moving image stream processing apparatus 402 performs the processing for generating a special reproduction bit stream, which has been described in the foregoing first to fourth embodiments, on the input bit stream and outputs the resulting processed bit stream. The moving image decoding apparatus 403 performs decoding processing on the input bit stream, and outputs the resulting decoded image to a moving image display apparatus 404. The moving image display apparatus 404 outputs and displays the input image on a display unit such as a CRT and a liquid crystal display.

In the present embodiment, the input bit stream is simply supplied to the moving image decoding apparatus 403 when in normal reproduction. When in special reproduction such as fast play and fast reverse play, the moving image stream processing apparatus 402 generates a special reproduction stream for fast play, fast reverse play, etc., and supplies the stream to the moving image decoding apparatus 403. Consequently, it is possible to provide a moving image reproduction apparatus that can implement special reproduction such as fast play and fast reverse play without adding a new function or the like intended for special reproduction to the moving image decoding apparatus.

[Sixth Embodiment]

Now, a sixth embodiment of the present invention will be described with reference to FIGS. 17, 18, and 19. FIG. 17 is a block diagram showing the configuration of the sixth embodiment. FIGS. 18 and 19 are diagrams showing examples of a management table according to the sixth embodiment.

A storage medium 501 contains coded bit streams 511 of moving images, and special reproduction bit streams 512 intended for special reproduction such as fast play and fast reverse play. The special reproduction bit streams 512 are generated by inputting the bit streams 511 into the moving image stream processing apparatus according to any one of the first to fourth embodiments. The storage medium 501 also has a management table 513 in which association information on the bit streams 511 and the special reproduction bit streams 512 is recorded. The reference sign 502 represents a bit stream switching apparatus, and 503 represents represents a bit stream sending apparatus.

The management table 513 contains information that allows switching between the bit streams 511 and the special reproduction bit streams 512. FIG. 18 shows a simple example of the management table 513. In the example of FIG. 18, the filenames of the files that contain the bit streams 511 and the special reproduction bit streams 512, respectively are stored in association with each other, whereby the stream switching is made possible. The management table 513 may contain such information as shown in FIG. 19.

In the example of FIG. 19, the filenames of the files that contain the bit streams and special reproduction streams (fast play bit streams and fast reverse play bit streams), respectively, are stored in association with each other. The time stamps of the bit streams 511 corresponding to the respective pictures of the special reproduction streams are also stored. Such information can be stored to allow the smooth switching of operation from normal reproduction to special reproduction or from special reproduction to normal reproduction with the time stamp of the reproduction point inherited.

In normal reproduction, the bit stream switching apparatus 502 reads a bit stream 511 from the storage medium 501, and supplies the bit stream to the bit stream sending apparatus 503. In special reproduction such as fast play and fast reverse play, the bit stream switching apparatus 502 refers to the management table 513, reads the special reproduction bit stream 512 associated with the bit stream 511, and supplies the special reproduction bit stream 512 to the bit stream sending apparatus 503. The bit stream sending apparatus 503 sends the input bit stream to a predetermined receiving terminal through a transmission channel such as a computer network.

In the present embodiment, the normal bit streams and the special reproduction bit streams are stored in association with each other. The normal bit streams are sent to the receiving terminal in normal reproduction, and the associated special reproduction bit streams are sent in special reproduction. Consequently, it is possible to provide a moving image distribution apparatus that can implement special reproduction such as fast play and fast reverse play without adding a new function or the like intended for special reproduction to the moving image decoding apparatus of the receiving terminal.

Note that the foregoing embodiments have dealt with the applications that conform to the H.264 moving image coding system. The present invention is not limited to such applications, however, and is also applicable to moving image coding systems that have pictures that are fully decodable by themselves and pictures whose image data part is decodable by itself but a part other that the image data part is not.

The conversion of an I-picture into an IDR-picture has been described in conjunction with the example of modifying "log2_max_frame_num_minus4" or "idr_pic_id" in value. It will be understood that the method of modification is not limited thereto.

For example, the values of "log2_maxpic_order_cnt_lsb_minus4" or "pic_parameter_set_id" may be modified to adjust the change in the bit length of the header part. The special reproduction has been exemplified by fast play and fast reverse play. However, the present invention is not limited to such reproduction systems. For example, the system of the present invention may be applied to reproduction on a play list, the movement of the reproduction point from one bit stream to another, etc.

The present invention described so far may be practiced by a computer reading a program from a recording medium and executing the program. That is, the present invention described above may be implemented by software.

When constructing the moving image stream processing apparatus by software, a program that describes the functions of the moving image stream processing apparatus shown in FIG. 5 or 12 may be stored in a storing unit such as a hard disk. According to the program program, a control unit or CPU can execute the processing (control) to provide the functions of the user information presentation system.

FIG. 20 is a block diagram showing an example of the configuration of the computer that constitutes the moving image stream processing apparatus according to the present embodiment.

The program that describes the functions of the moving image stream processing apparatus shown in FIG. 5 or 12 is stored in a disk device 1101 such as a hard disk device. When implementing the functions of the moving image stream processing apparatus shown in FIG. 5, the disk device 1101 also stores the bit stream that is input to the stream extraction unit 201, bit streams that are extracted by the stream extraction unit 201, and bit streams that are converted by the stream conversion unit 203. When implementing the functions of the moving image stream processing apparatus shown in FIG. 12, the disk device 1101 also functions as the coding parameter set storing unit 304. A CPU 1103 executes the program that implements the functions of the moving image stream processing apparatus. The reference sign 1105 represents a bus such as a data bus, and 1102 a memory such as a DRAM that stores information necessary for the information processing of the CPU 1103. An I/O device 1104 serves as a communication unit that outputs the processed bit stream to outside.

It should be appreciated that the program (also referred to as a program product) may be stored in a computer-readable information recording medium such as a FD (floppy disk), CD-ROM, DVD, and flash memory. While in FIG. 20 a disk device is used as the storing unit, the functions of the moving image stream processing apparatus may be provided by reading the program recorded on a computer-readable information recording medium such as FD and CD-ROM into the disk device of the computer and executing the processing.

Up to this point, representative embodiments of the present invention have been described. However, the present invention may be carried out in various other forms without departing from its spirit or essential characteristics set forth by the appended claims. The foregoing embodiments are therefore to be considered as mere illustrative and not restrictive. The scope of the invention is given by the appended claims, and is not restricted by the foregoing description or abstract. All changes and modifications which come within the meaning and range of equivalency of the claims are intended to be embraced within the scope of the present invention.

{Reference Signs List}
101: stream extraction unit
102: stream rearrangement unit
201: stream extraction unit
202: switching unit
203: stream conversion unit
204: stream rearrangement unit
301: stream extraction unit
302: switching unit
303: stream rearrangement unit
304: coding parameter set storing unit
305: stream conversion unit
306: stream generating unit
401: bit stream switching apparatus
402: moving image stream processing apparatus
403: moving image decoding apparatus
404: moving image display apparatus
501: storage medium
502: bit stream switching apparatus
503: bit stream sending apparatus
511: bit stream
512: special reproduction bit stream
513: management table

The invention claimed is:

1. A moving image stream processing apparatus comprising:
    an extraction unit that extracts, from a bit stream being a coded moving image, a first bit stream of a picture that is decodable by itself and a second bit stream of a picture including an image data part and a header part, the image data part being decodable by itself, the header part being not decodable by itself; and
    a conversion unit that converts the header part of the second bit stream extracted by the extraction unit so that the header part is decodable by itself, to convert the second bit stream into a third bit stream of a picture that is decodable by itself,
    the moving image stream processing apparatus arranging and outputting the first bit stream of the picture extracted by the extraction unit and the third bit stream in order of extraction or in reverse order to that of extraction.

2. The moving image stream processing apparatus according to claim 1, wherein the conversion unit converts the second bit stream into the third bit stream by modifying contents of the header part in the second bit stream.

3. The moving image stream processing apparatus according to claim 2, wherein, when converting the second bit stream into the third bit stream, the conversion unit decodes the image data part and re-encodes the image data part with no change in image content so that the image data part satisfies a byte alignment specification, if a change in bit length of the part other than the image data part is not a multiple of 8.

4. The moving image stream processing apparatus according to claim 2, wherein the conversion unit modifies the contents of the part other than the image data part in the second bit stream so that a change in bit length of the header part is a multiple of 8.

5. A moving image reproduction apparatus comprising:
    the moving image stream processing apparatus according to claim 1;
    a moving image decoding apparatus that decodes a bit stream being a coded moving image;
    a bit stream switching apparatus that switches so as to supply an input bit stream to the moving image decoding apparatus when in normal reproduction, and supply the input bit stream to the moving image stream processing apparatus and supply a bit stream processed by the moving image stream processing apparatus to the moving image decoding apparatus when in special reproduction for fast play or fast reverse play; and
    a moving image display apparatus that displays a decoded image from the moving image decoding apparatus.

6. A non-transitory storage medium containing: a bit stream being a moving image; a special reproduction bit stream that is processed by the moving image stream processing apparatus according to claim 1; and a management table that contains information for associating the bit stream with the special reproduction bit stream.

7. A moving image distribution apparatus comprising:
    the storage medium according to claim 6;
    a bit stream switching apparatus that reads the bit stream from the storage medium when in normal reproduction, and refers to the management table and reads the special reproduction bit stream associated with the bit stream when in special reproduction; and
    a bit stream sending apparatus that sends the bit stream read by the bit stream switching apparatus to a receiving terminal.

8. A moving image stream processing method comprising:
extracting by an extraction unit, from a bit stream being a coded moving image, a first bit stream of a picture that is decodable by itself and a second bit stream of a picture including an image data part and a header part, the image data part being decodable by itself, the header part being not decodable by itself;

converting the header part of the extracted second bit stream so that the header part is decodable by itself, to convert the second bit stream into a third bit stream of a picture that is decodable by itself; and arranging and outputting the extracted first bit stream and the third bit stream in order of extraction or in reverse order to that of extraction.

9. A non-transitory computer-readable medium stored therein a program for making a computer perform the processing of:

extracting, from a bit stream being a coded moving image, a first bit stream of a picture that is decodable by itself and a second bit stream of a picture including an image data part and a header part, the image data part being decodable by itself, the header part being not decodable by itself;

converting the header part of the extracted second bit stream so that the header part is decodable by itself, to convert the second bit stream into a third bit stream of a picture that is decodable by itself; and arranging and outputting the extracted first bit stream and the third bit stream in order of extraction or in reverse order to that of extraction.

* * * * *